United States Patent
Chen

(10) Patent No.: US 7,011,189 B2
(45) Date of Patent: Mar. 14, 2006

(54) FINE ADJUSTING STRUCTURE FOR BICYCLE DISC-BRAKE SYSTEM

(76) Inventor: Cheng Wen Chen, PO Box 82-144, Taipei (TW)

( * ) Notice: Subject to any disclaimer, the term of this patent is extended or adjusted under 35 U.S.C. 154(b) by 0 days.

(21) Appl. No.: 10/785,000

(22) Filed: Feb. 25, 2004

(65) Prior Publication Data

US 2004/0188186 A1    Sep. 30, 2004

(30) Foreign Application Priority Data

Mar. 31, 2003    (TW) .............................. 92205263 U

(51) Int. Cl.
*B62L 5/00*   (2006.01)

(52) U.S. Cl. ................. 188/26; 188/24.11; 188/205 R; 188/24.22

(58) Field of Classification Search ................. 188/26, 188/24.11, 24.12, 24.22, 24.19, 72.9, 72.7, 188/72.8, 344, 205 R, 206 R; 280/276
See application file for complete search history.

(56) References Cited

U.S. PATENT DOCUMENTS 6,230,850 B1 *    5/2001    Huang ..................... 188/24.21
6,564,910 B1 *    5/2003    Chen et al. .................... 188/26
2004/0159503 A1 *    8/2004    Juan ........................ 188/24.11
2004/0188186 A1 *    9/2004    Chen ............................ 188/26

FOREIGN PATENT DOCUMENTS

DE    202004003799 U1 *    6/2004

\* cited by examiner

*Primary Examiner*—Melody M. Burch
(74) *Attorney, Agent, or Firm*—Leong C. Lei

(57) ABSTRACT

A fine adjusting structure for bicycle disc-brake system is disclosed. The disc-brake system comprises a securing seat mounted on to the fork of the bicycle frame and the securing seat being locked with a braking main body having a driving arm, the wheel of the bicycle being mounted with brake disc for the gripping of the braking main body, characterized in that the top and bottom end of the securing seat are respectively protruded out a locking section toward the braking main body and the securing seat is substantially a "C" shaped structure, the top and bottom of the locking section are formed into elongated hole which passes through from top to bottom, the long axis of the elongated hole is extended in the same direction of the wheel axle; and the top and bottom edge of the braking main body are respectively formed into screw holes corresponding to the elongated hole of the locking section of the securing seat.

2 Claims, 4 Drawing Sheets

FINE ADJUSTING STRUCTURE FOR BICYCLE DISC-BRAKE SYSTEM

BACKGROUND OF THE INVENTION (a) Technical Field of the Invention

The present invention relates to angle adjusting technology, and in particular, to fine adjusting structure used in disc-brake system of a bicycle. The securing seat of the fine adjusting structure is directly locked to the top and bottom edge of the braking main body of the brake system and the X-axis and Y-axis of adjustment can be made.

(b) Description of the Prior Art

Bicycles are nowadays used as a commuting means as well as an exercising equipment. In order to upgrade high quality bicycle, disc-brake system is installed so as to solve the poor braking efficiency and poor durability of the conventional brake system.

FIG. 1 shows a conventional disc-brake system including a securing seat 11 mounted onto the fork 10 of a bicycle frame. The securing seat 11 is directly locked to the corresponding braking main body 20. The braking main body 20 has a driving arm 25 for the pulling of the braking handle so as to control the braking of braking main body 20 against the braking disc-brake 30 on the wheel. The effectiveness of the brake depends on the tightness of the braking main body 20 with the surface of the braking disc brake 30. However, only a gap between the braking main body 20 with the screw nut, there is no other adjustable space and therefore, the quality of installation of the brake main body is poor. In addition, an inclination between the braking main body 20 and the braking disc 30, and this will affect the efficiency of braking, and the installation is not convenient.

In order to solve the above problem, a plurality of angle adjusting structure for disc brake system have been developed. However, this structure is complicated and the adjustment of angle is not convenient. Further, this structure is normally made based on the braking main body. Due to the fact that the braking main body is fabricated by means of stamping, therefore, the cost of production is high, and it is only installed to more high-class bicycles and it is not commonly found in common bicycle or bicycles for kids. Accordingly, it is an object of the present invention to provide a fine adjusting structure for bicycle disc-brake system which fully mitigates the above drawbacks and the fine adjusting of the braking main body is convenient.

SUMMARY OF THE INVENTION

It is an object of the present invention to provide a fine adjusting structure for bicycle disc-brake system, having a securing seat mounted on to the fork of the bicycle frame and the securing seat being locked with a braking main body having a driving arm, the wheel of the bicycle being mounted with brake disc for the gripping of the braking main body, characterized in that the top and bottom end of the securing seat are respectively protruded out a locking section toward the braking main body and the securing seat is substantially a "C" shaped structure, the top and bottom of the locking section are formed into elongated hole which passes through from top to bottom, the long axis of the elongated hole is extended in the same direction of the wheel axle; and the top and bottom edge of the braking main body are respectively formed into screw holes corresponding to the elongated hole of the locking section of the securing seat.

Still a further object of the present invention is to provide a fine adjusting structure for bicycle disc-brake system, wherein the lateral wall of the top and bottom end of the securing seat are respectively formed into locking holes for mounting the securing seat to the fork of the bicycle with screw bolts.

A further object of the present invention is to provide a fine adjusting structure for bicycle disc-brake system, wherein the braking main body and the corresponding angle of the disc brake are conveniently adjusted, and the installation is simple. Thus, the cost of production is low.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
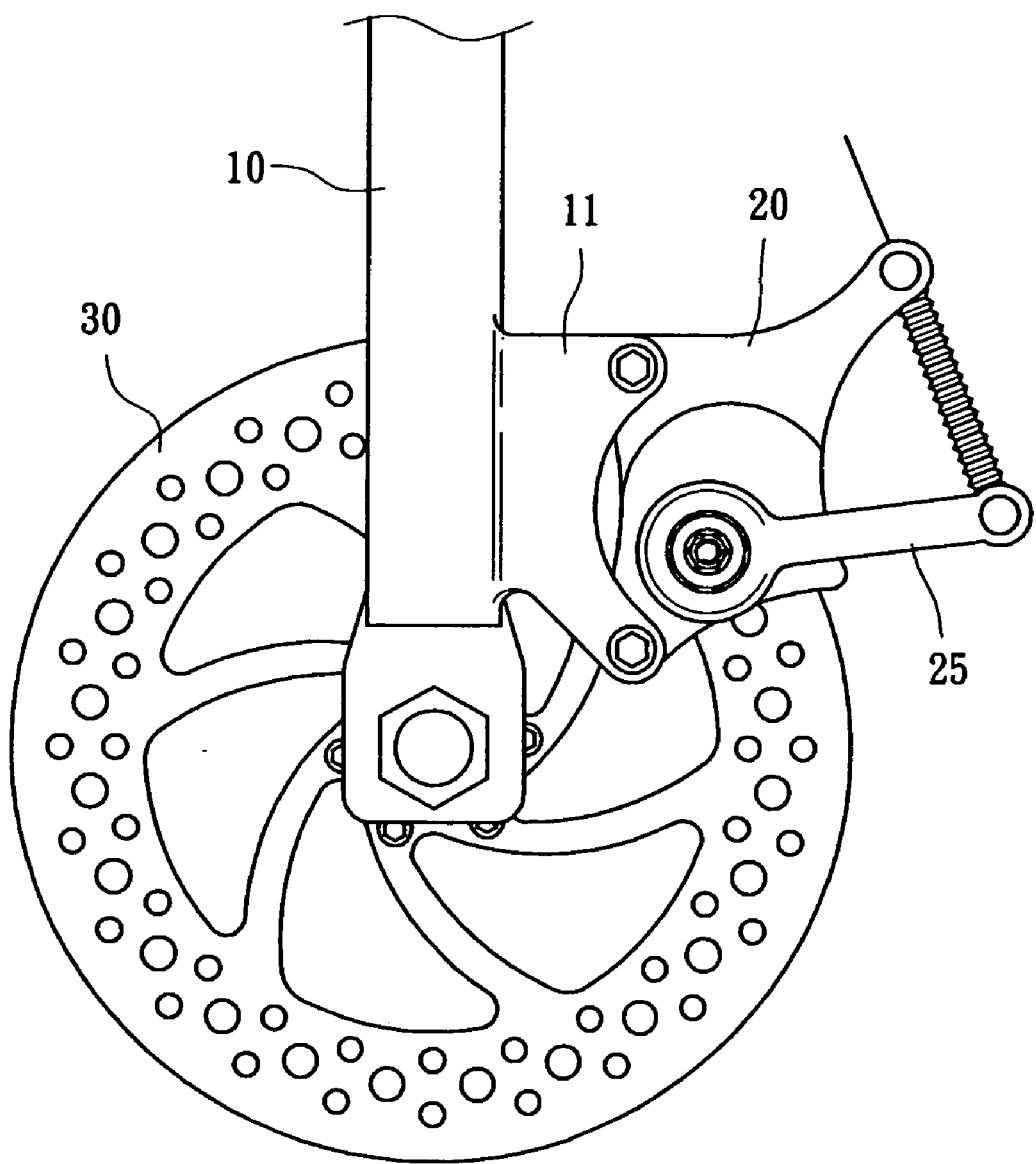
FIG. 1 is a schematic view showing a conventional disc-brake system for bicycle.
Figure 2:
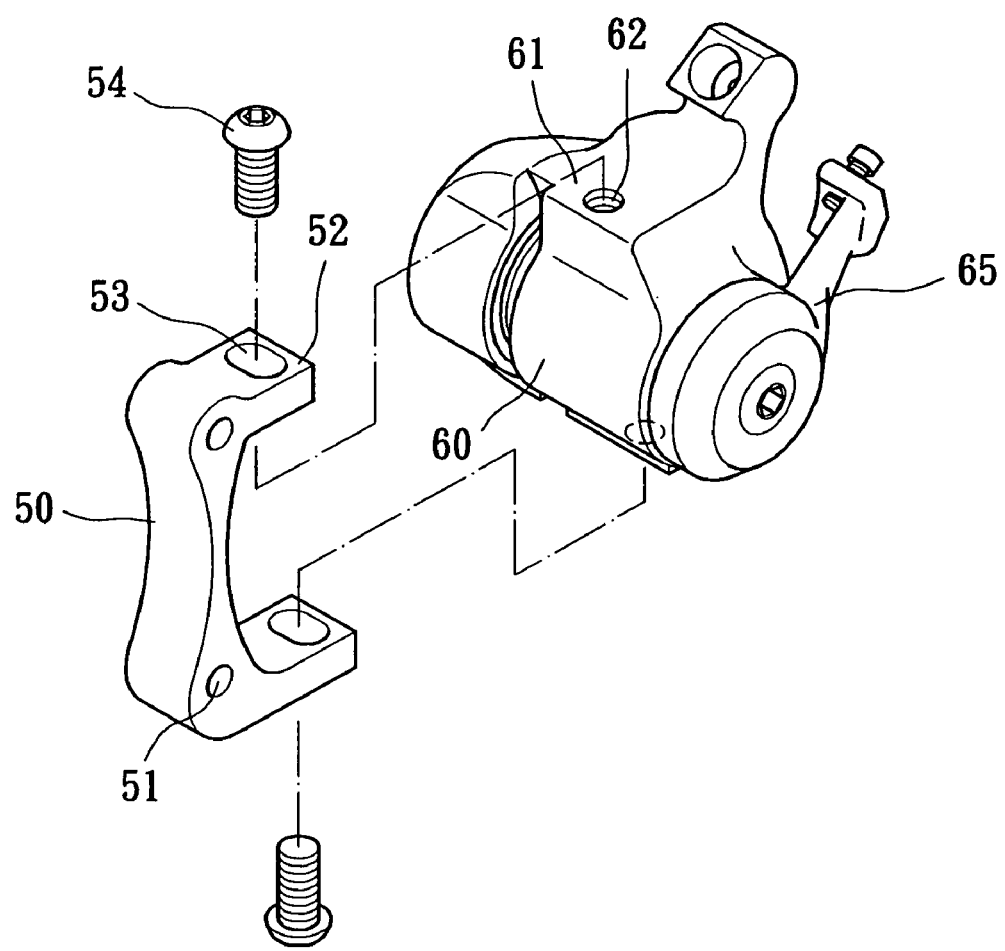
FIG. 2 is a perspective exploded view of a fine adjusting structure for bicycle disc-brake system of the present invention.
Figure 3:
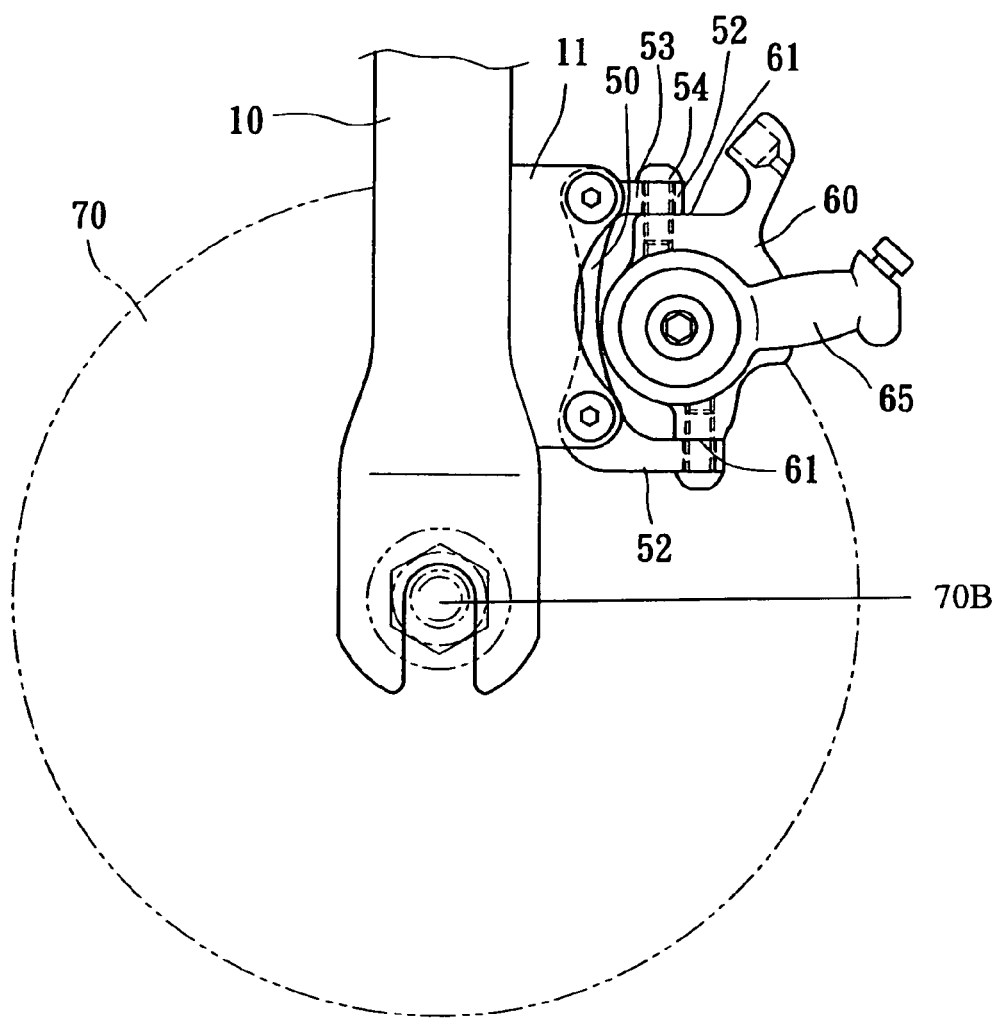
FIG. 3 is a schematic view showing the disc-brake system for bicycle in accordance with the present invention.

Referring to FIGS. 2 and 3, there is shown a fine adjusting structure for brake disc of the disc brake system used in bicycle. The brake system comprises a securing seat 11 formed on the fork 10 of a bicycle. The fixing seat 11 is locked with a braking main body 60 having a driving arm 65. The wheel of the bicycle is secured with a braking disc-brake 70. When the braking handle moves the driving arm 65, a braking action is occurred where the braking main body 60 grips the disc brake 70. This will provide a braking to the bicycle.

As shown in FIGS. 2 and 3, a securing seat 50 is mounted between a fixing seat 11 and the braking main body 60. The securing seat 50 has lateral wall at the top and bottom end, wherein the lateral wall is provided with locking hole 51. The locking holes 51 are corresponding to the through hole of the fixing seat 11, and screw bolts are used to lock the securing seat 50 to the fixing seat 11 of the fork 10 of the bicycle. The top and bottom end of the securing seat 50 are respectively protruded out with a locking section 52 toward the braking main body 60. The securing seat 50 is a substantially "C" shape body and the top and bottom locking sections 52 are provided with an elongated hole 53 in communication from top to bottom. The long axial line of the elongated hole 53 is extended in the same direction of the wheel axle 70B.

The top and bottom edge of the braking main body 60 are formed into flat combination face 61 so that the braking main body 60 can be engaged between two locking sections 52 of the securing seat 50 and the two flat combination faces 61 are closely adhered to the corresponding inner face of the two locking section 52. Further, the two combination faces 61 of the braking main body 60 are respectively formed with a screw hole 62 which correspond to the elongated hole 53 of the locking section 52 of the securing seat 50. Screw bolt 54 is used to lock the braking main body 60 from top to bottom to the securing seat 50.

Figure 4:
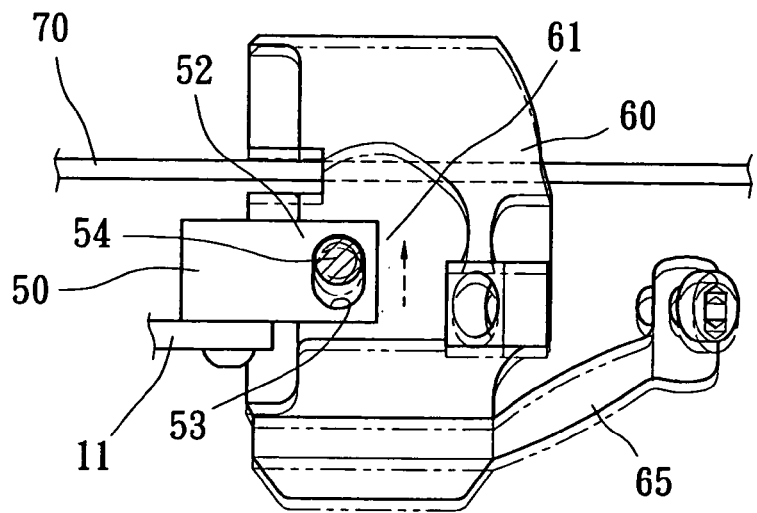
FIG. 4 is a schematic view showing the fine adjustment of the disc-brake system of the present invention. It is shown that the braking main body is adjusted in a direction.
Figure 5:
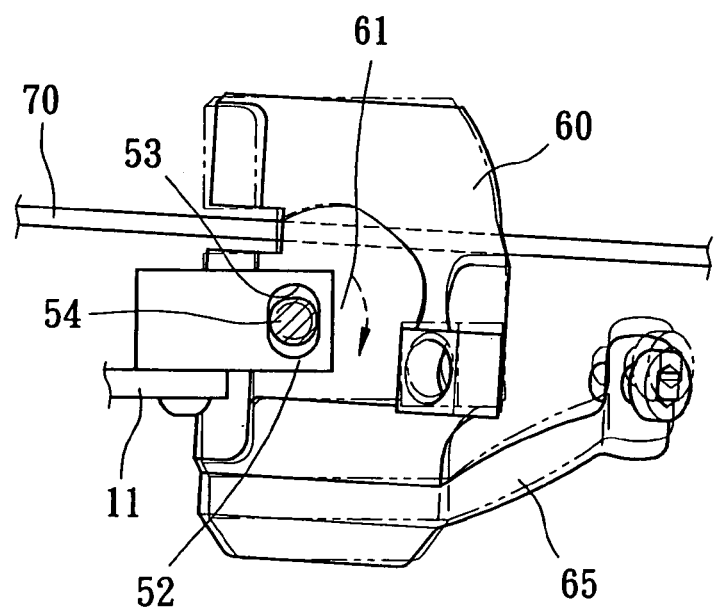
FIG. 5 is another schematic view showing the fine adjustment of the disc-brake system of the present invention. It is shown that the main body is adjusted in a direction.

In application, as shown in FIGS. 3, 4 and 5, after the screw bolt 54 is loosen, the braking main body 60 is adjusted with respect to a distance from the disc-brake 70, as shown in FIG. 4. The braking main body 60 corresponding to an inclined angle with the brake disc 70, (as shown in FIG. 5), the braking main body 60 can be tightly adhered to the surface of the disc brake 70. Thus the effectiveness of braking is greatly improved.

The advantages of the present invention are that:
(1) The structure for the fine adjusting is simple, wherein a securing seat 50 is used and the installation is simple and convenient.
(2) The adjustment of the fine adjusting structure is simple by releasing the screw bolts 54. This will adjust the braking main body 60 in with respect to the disc 70.
(3) The cost of production is low as the structure of the braking main body 60 can be simplified and the volume of the structure is greatly reduced. Thus, the cost of production is low.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A fine adjusting structure of disc-brake system for a bicycle having a securing seat mounted on to a fork of a bicycle frame and the securing seat being locked with a braking main body having a driving arm, a brake disc being disposed to be gripped by the braking main body, wherein a top end and bottom end of the securing seat are respectively protruded out with a locking section toward the braking main body and the securing seat is substantially a C-shaped structure, an elongated hole passes through from top to bottom of each locking section, a long axis of each elongated hole is extended in the same direction of a wheel axle; and a top and bottom surface of the braking main body are respectively formed with screw holes correspond to the respective elongated hole of the respective locking section of the securing seat.

2. The fine adjusting structure of claim 1, wherein a lateral wall of the top and bottom ends of the securing seat are respectively formed with locking holes for mounting the securing seat to the fork of the bicycle with screw bolts.

* * * * *